(12) United States Patent
Katsumata

(10) Patent No.: US 9,800,138 B2
(45) Date of Patent: Oct. 24, 2017

(54) POWER FACTOR CORRECTION CIRCUIT

(71) Applicant: FUJI ELECTRIC CO., LTD., Kawasaki-shi (JP)

(72) Inventor: Hiroki Katsumata, Tokyo (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 43 days.

(21) Appl. No.: 14/882,415

(22) Filed: Oct. 13, 2015

(65) Prior Publication Data
US 2016/0036319 A1 Feb. 4, 2016

Related U.S. Application Data

(63) Continuation of application No. PCT/JP2013/076642, filed on Oct. 1, 2013.

(51) Int. Cl.
*H02M 1/42* (2007.01)
*H02M 1/14* (2006.01)
(Continued)

(52) U.S. Cl.
CPC ........... *H02M 1/4208* (2013.01); *H02M 1/14* (2013.01); *H02M 1/4225* (2013.01); *H02M 1/4233* (2013.01); *H02M 1/44* (2013.01); *H02M 7/06* (2013.01); *H02M 1/42* (2013.01); *Y02B 70/126* (2013.01)

(58) Field of Classification Search
CPC .... H02M 1/42; H02M 1/4208; H02M 1/4225; H02M 1/44; H02M 1/14; H02M 7/06; H02M 7/062; H02M 1/4233
See application file for complete search history.

(56) References Cited

U.S. PATENT DOCUMENTS 7,012,413 B1 * 3/2006 Ye ........................... H02M 1/42
  323/222
8,040,114 B2 * 10/2011 Saint-Pierre ........ H02M 1/4225
  323/222
(Continued)

FOREIGN PATENT DOCUMENTS

JP  2009-038957 A  2/2009
JP      4363067 B2 11/2009
(Continued)

*Primary Examiner* — Matthew Nguyen
(74) *Attorney, Agent, or Firm* — Rabin & Berdo, P.C.

(57) ABSTRACT

A power factor correction circuit includes a rectifier that rectifies AC power supply voltage, a series circuit of an inductor and a semiconductor switch connected between the rectifier circuit output terminals, and a series circuit of a diode and a smoothing capacitor connected to both ends of the semiconductor switch, a load connected to both ends of the smoothing capacitor, so that the power factor on the input side of the rectifier circuit is corrected by the switching operation of the semiconductor switch. This power factor correction circuit includes a control circuit that controls the switching frequency of the semiconductor switch such that the switching frequency becomes maximum when the ripple of a current flowing through the inductor becomes maximum. According to this power factor correction circuit, normal mode noise can be reduced, and the size of a filter circuit can be decreased.

11 Claims, 11 Drawing Sheets

(51) Int. Cl.
*H02M 1/44* (2007.01)
*H02M 7/06* (2006.01)

(56) References Cited

U.S. PATENT DOCUMENTS

| | | | |
|---|---|---|---|
| 8,345,456 B2 * | 1/2013 | Nishikawa | H02M 1/4225 |
| | | | 323/207 |
| 2009/0016087 A1 | 1/2009 | Shimizu | |
| 2010/0097829 A1 | 4/2010 | Uno et al. | |
| 2011/0188273 A1 * | 8/2011 | Pansier | H02M 1/4225 |
| | | | 363/44 |
| 2013/0127432 A1 | 5/2013 | Chen | |
| 2013/0301317 A1 | 11/2013 | Ishii | |
| 2015/0303790 A1 * | 10/2015 | Lin | H02M 1/4225 |
| | | | 363/89 |

FOREIGN PATENT DOCUMENTS

| JP | 2011-155813 A | 8/2011 |
|---|---|---|
| WO | WO-2009-008197 A1 | 1/2009 |
| WO | WO 2012-101698 A1 | 8/2012 |

\* cited by examiner

POWER FACTOR CORRECTION CIRCUIT

CROSS-REFERENCE TO RELATED APPLICATIONS

The present application is a continuation of WO2015049716A1, published on Apr. 9, 2015, filed on Oct. 1, 2013 as PCT/JP2013/076642, herein incorporated by reference.

TECHNICAL FIELD

The present invention relates to a power factor correction circuit for improving the input power factor in a power convertor that supplies rectified voltage of AC power supply voltage to a load.

BACKGROUND ART

When AC power supply voltage is rectified by a full wave rectifier circuit, the input current is distorted and the power factor drops. Therefore in a conventional well-known power factor correction circuit, a boost chopper, constituted by an inductor (boost reactor), a semiconductor switch, a diode for rectification and a smoothing capacitor, is connected to the output side of the full wave rectifier circuit, and the distortion of the input current is suppressed by the switching operation of the boost chopper.

FIG. 8 is a power factor correction circuit of this kind disclosed in Japanese Patent No. 4363067 (e.g., ¶¶[0026] to [0052] and FIG. 1 to FIG. 8 thereof).

In FIG. 8, 10 is an AC power supply, 20 is a full wave rectifier circuit constituted by a diode bridge, 31 is an inductor, 32 is a current detection resistor, 33 is a semiconductor switch, 34 is a diode for rectification, 35 is a smoothing capacitor, and 40 is a load. Here the inductor 31, the semiconductor switch 33, the diode for rectification 34 and the smoothing capacitor 35 constitute the boost chopper, which repeats storing and releasing energy to/from the inductor 31 by turning the semiconductor switch 33 ON/OFF, so as to boost the voltage of the smoothing capacitor 35 to a DC voltage that is higher than the output voltage of the full wave rectifier circuit 20, and supply the boosted voltage to the load 40.

50 is a control circuit that controls the semiconductor switch 33, 51 is an error amplifier that amplifies an error between a reference voltage 52 and an output voltage of a main circuit, 53 is a multiplier that multiplies the output of the error amplifier 54 by the positive side terminal voltage of the full wave rectifier circuit 20, 54 is an error amplifier that amplifies an error between the output of the multiplier 53 and the negative side terminal voltage (voltage at one end of the current detection resistor 32) of the full wave rectifier circuit 20, 55 is a voltage control oscillator (VCO) that outputs a triangular wave signal in accordance with the magnitude of the positive side terminal voltage of the full wave rectifier circuit 20, and 56 is a PWM comparator that compares a feedback signal FB output from the error amplifier 54 and the triangular wave signal output from the VCO 55, and the semiconductor switch 33 is driven by a PWM pulse output from the comparator 56.

In this prior art, the PWM comparator 56 generates the PWM pulse that continuously compensates the fluctuations of the AC power supply voltage and the DC output voltage, and the input power factor is corrected by matching the AC current waveform with the AC voltage waveform.

At the same time, as shown in FIG. 9, switching frequency f of the semiconductor switch 33 is changed by the function of the VCO 55 in proportion to the magnitude of the AC power supply voltage $V_{in}$, whereby normal mode noise generated by switching is dispersed with respect to the frequency, and noise and switching loss are reduced.

In terms of the operation of the circuit shown in FIG. 8, the error amplifier 51 amplifies the error between the reference voltage 52 and the DC output voltage of the main circuit, and the result of multiplying this error voltage by the positive side terminal voltage of the full wave rectifier circuit 20 is input to a non-inverting input terminal of the error amplifier 54. The error amplifier 54 computes error voltage based on this multiplication result and voltage at one end of the current detection resistor 32, and this error voltage is input to a non-inverting input terminal of the PWM comparator 56 as a feedback signal FB.

On the other hand, the VCO 55 has a voltage frequency conversion characteristic to change the frequency f from $f_1$ to $f_2$ in a range from the lower limit value $E_1$ to the upper limit value $E_2$ of the input voltage E, as shown in FIG. 10, and outputs a triangular wave signal of which upper limit frequency is $f_2$ shown in the upper level of FIG. 11A, or a triangular wave signal of which lower limit frequency is $f_1$ shown in the upper level of FIG. 11B, for example, in accordance with the magnitude of the input voltage E.

The comparator 56 compares the triangular wave signal and the feedback signal FB output from the error amplifier 54 and generates the PWM pulse shown in the lower level of FIG. 11A or FIG. 11B, and switches the semiconductor switch 33 by this PWM pulse.

According to the prior art disclosed in Japanese Patent No. 4363067, noise is suppressed by dropping the switching frequency f to reduce the switching loss in a range where the AC power supply voltage $V_{in}$ is particularly low, and dispersing noise due to switching with respect to the frequency, as mentioned above.

However this prior art is based on the concept that the switching frequency f is simply changed in proportion to the magnitude of the AC power supply voltage $V_{in}$. Therefore depending on the magnitude of the AC power supply voltage $V_{in}$, the noise reduction effect may not be demonstrated sufficiently, and a large filter circuit, including a noise mode coil or the like, must be additionally used in order to satisfy the predetermined conduction noise regulation.

DISCLOSURE OF THE INVENTION

With the foregoing in view, it is an object of the present invention to provide a power factor correction circuit that can dramatically reduce the normal mode noise and make the filter circuit smaller by changing the switching frequency of the semiconductor switch for power factor correction using a method that is different from the method disclosed in Japanese Patent No. 4363067.

To solve the problem, an aspect of the invention is a power factor correction circuit, in which a series circuit including an inductor and a semiconductor switch is connected between output terminals of an AC power supply, a series circuit of a diode and a smoothing capacitor is connected to both ends of the semiconductor switch, and a load is connected to both ends of the smoothing capacitor, so that a power factor on an input side of the circuit is corrected by a switching operation of the semiconductor switch, the power factor correction circuit having a control circuit that makes switching frequency of the semiconductor switch variable. In this power factor correction circuit, the control circuit controls the switching frequency such that the switching frequency becomes the maximum when a ripple of a current flowing through the inductor becomes the maximum.

Another aspect of the invention includes a rectifier circuit that rectifies AC power supply voltage, a series circuit of an inductor and a semiconductor switch that is connected between output terminals of the rectifier circuit, and a series circuit of a diode and a smoothing capacitor that is connected to both ends of the semiconductor switch, and in which a load is connected to both ends of the smoothing capacitor, so that a power factor on an input side of the rectifier circuit is corrected by a switching operation of the semiconductor switch, the power factor correction circuit having a control circuit that makes switching frequency of the semiconductor switch variable. In this power factor correction circuit, the control circuit controls the switching frequency such that the switching frequency becomes the maximum when a ripple of a current flowing through the inductor becomes the maximum.

Yet another aspect of the invention has a voltage detection circuit that detects AC power supply voltage as input voltage, and a voltage detection circuit that detects end-to-end voltage of the smoothing capacitor as output voltage. In this power factor correction circuit, the control circuit controls the switching frequency to a maximum value by detecting a timing when the ripple becomes the maximum based on a ratio of the input voltage to the output voltage.

In a further aspect of the invention the control circuit detects that the ripple is the maximum when the ratio of the input voltage to the output voltage is 0.5.

In yet another aspect of the invention a series circuit including an inductor and a semiconductor switch is connected between output terminals of an AC power supply, a series circuit of a diode and a smoothing capacitor is connected to both ends of the semiconductor switch, and a load is connected to both ends of the smoothing capacitor, so that a power factor on an input side of the circuit is corrected by a switching operation of the semiconductor switch, the power factor correction circuit having a control circuit that makes switching frequency of the semiconductor switch variable. In this power factor correction circuit, the control circuit controls the switching frequency such that the switching frequency becomes the maximum when a third-order harmonic component of a ripple of a current flowing through the inductor becomes the maximum.

A further aspect of the invention includes a rectifier circuit that rectifies AC power supply voltage, a series circuit of an inductor and a semiconductor switch that is connected between output terminals of the rectifier circuit, and a series circuit of a diode and a smoothing capacitor that is connected to both ends of the semiconductor switch, and in which a load is connected to both ends of the smoothing capacitor, so that a power factor on an input side of the rectifier circuit is corrected by a switching operation of the semiconductor switch, the power factor correction circuit having a control circuit that makes switching frequency of the semiconductor switch variable. In this power factor correction circuit, the control circuit controls the switching frequency such that the switching frequency becomes the maximum when a third-order harmonic component of a ripple of a current flowing through the inductor becomes the maximum.

A further aspect of the invention has a voltage detection circuit that detects AC power supply voltage as input voltage, and a voltage detection circuit that detects end-to-end voltage of the smoothing capacitor as output voltage, wherein the control circuit controls the switching frequency to a maximum value by detecting a timing when the third-order harmonic component of the ripple becomes the maximum based on a ratio of the input voltage to the output voltage.

In another aspect of the power factor correction circuit, the control circuit detects that the third-order harmonic component of the ripple is the maximum when the ratio of the input voltage to the output voltage is 5/6, 3/6 or 1/6, or when a duty ratio of a pulse to switch the semiconductor switch is 1/6, 3/6 or 5/6.

According to the present invention, the normal mode noise can be effectively reduced and the filter circuit and the entire apparatus can be made smaller by controlling the switching frequency of the semiconductor switch based on the input/output voltage of the power factor correction circuit.

BEST MODE FOR CARRYING OUT THE INVENTION

Figure 1:
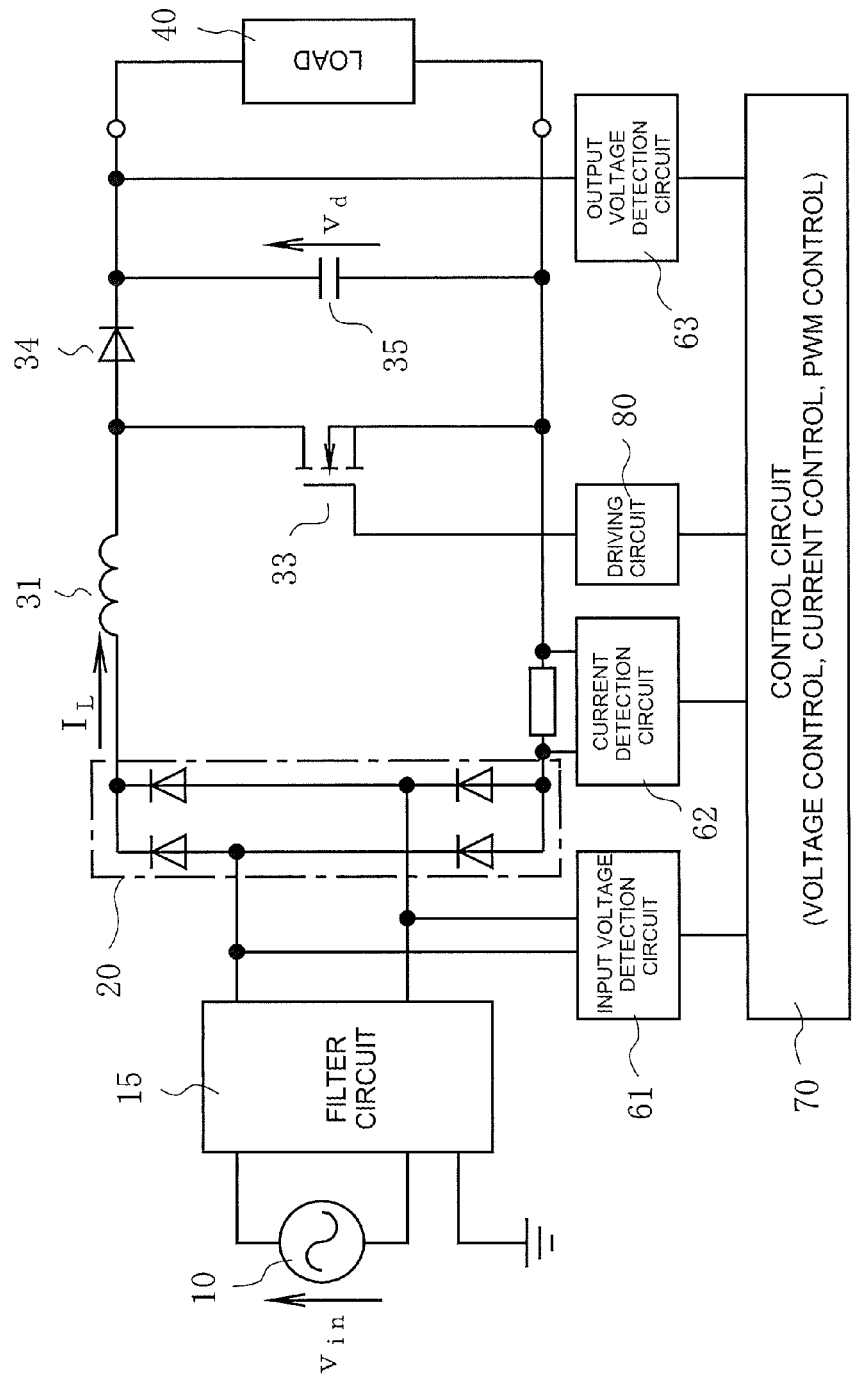
FIG. 1 is a block diagram of a power factor correction circuit according to an embodiment of the present invention.
Figure 8:
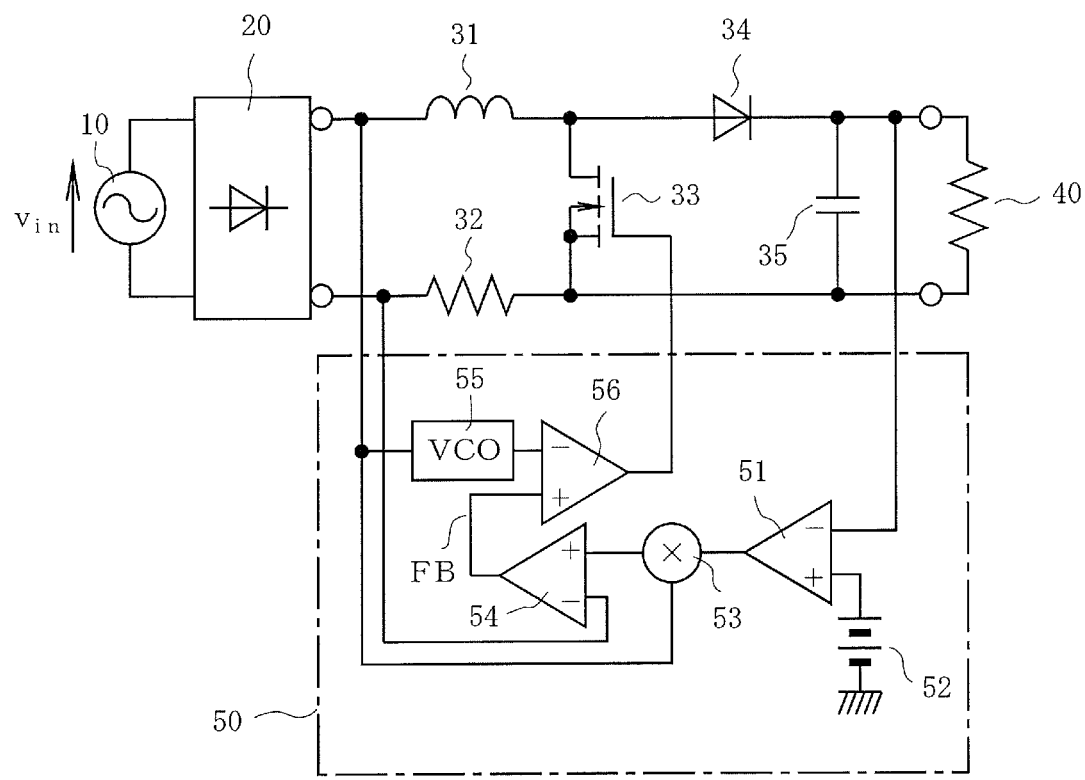
FIG. 8 is a block diagram of a prior art power factor correction circuit disclosed in Japanese Patent No. 4363067.
Figure 9:
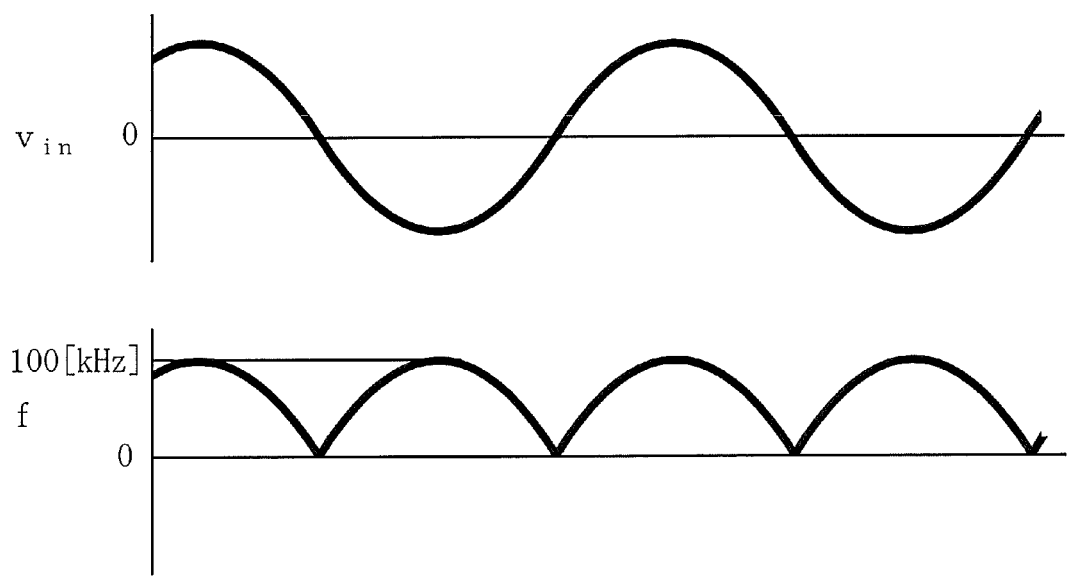
FIG. 9 is a timing chart depicting the relationship between the AC power supply voltage and the switching frequency in FIG. 8.
Figure 10:
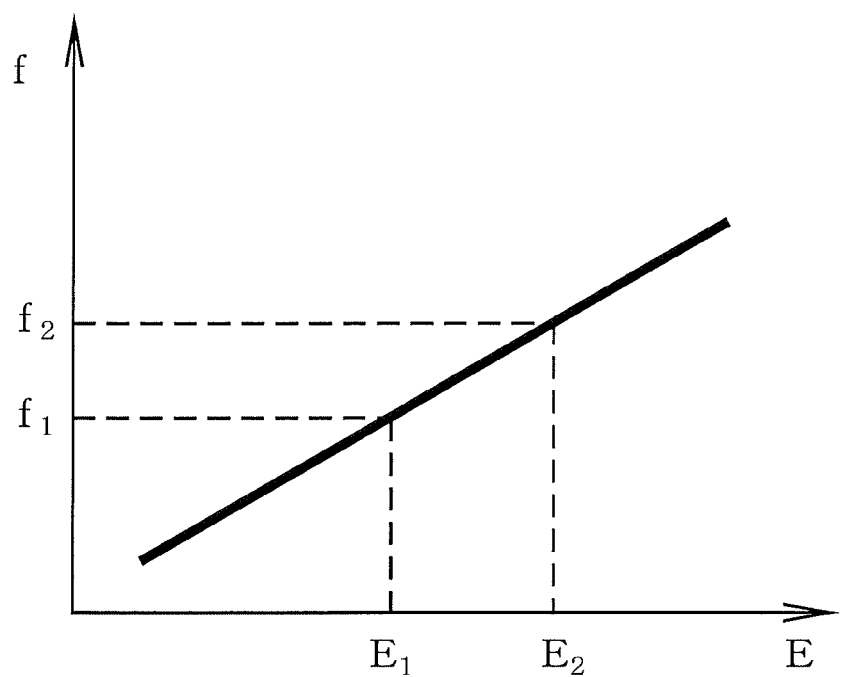
FIG. 10 is a diagram for explaining the voltage frequency conversion characteristic of the VCO in FIG. 8.
Figure 11A:
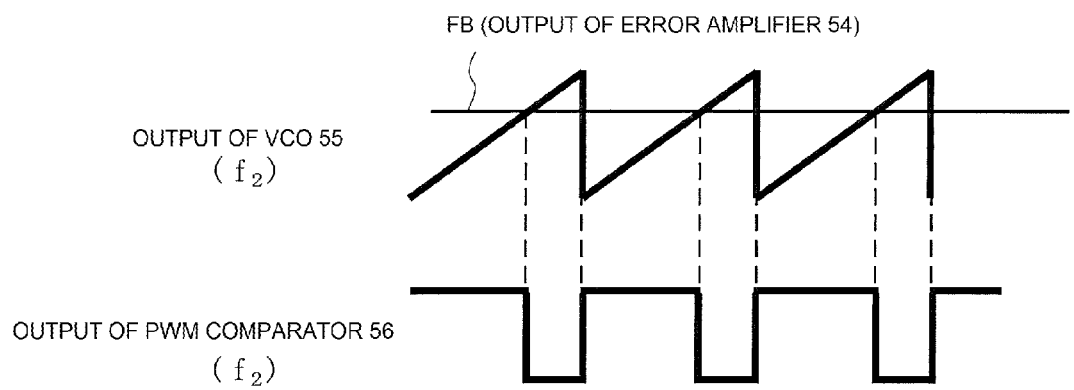
FIGS. 11A and 11B are timing charts depicting the operation of the VCO and the PWM comparator in FIG. 8.
Figure 11B:
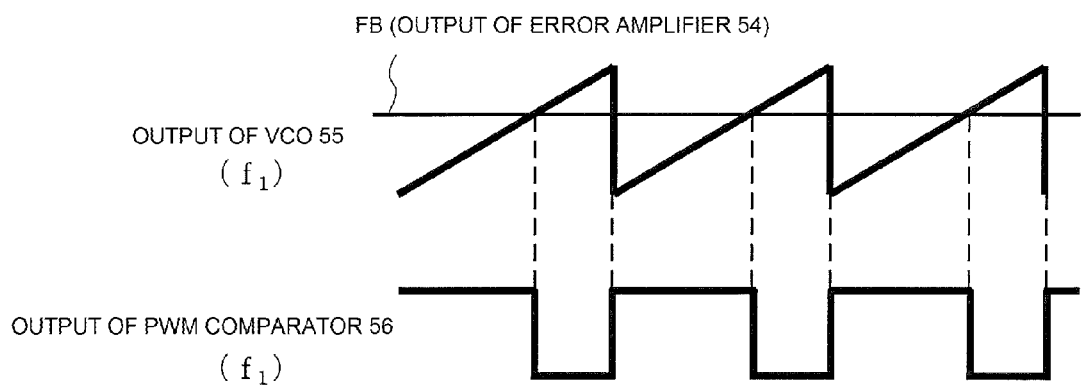

Embodiments of the present invention will now be described with reference to the drawings. FIG. 1 is a block diagram of a power factor correction circuit according to this embodiment, where a composing element the same as FIG. 8 is denoted with the same reference symbol.

In FIG. 1, 10 is an AC power supply, 15 is a filter circuit constituted by a reactor, a capacitor or the like, 20 is a full wave rectifier circuit constituted by a diode bridge, 31 is an inductor (boost reactor), 32 is a current detection resistor, 33 is a semiconductor switch (e.g. MOSFET), 34 is a diode for rectification, 35 is a smoothing capacitor, and 40 is a load. As mentioned above, the inductor 31, the semiconductor switch 33, the diode for rectification 34, and the smoothing capacitor 35 constitute a boost chopper, which repeats storing and releasing energy to/from the inductor 31 by turning the semiconductor switch 33 ON/OFF, so as to boost the voltage of the smoothing capacitor 35 to a DV voltage that is higher than the output voltage of the full wave rectifier circuit 20, and supply the boosted voltage to the load 40.

An input voltage (AC power supply voltage) detection circuit 61 is connected between the input terminals of the full wave rectifier circuit 20, and a current defection circuit 62 is connected to both ends of the current detection resistor 32, and an output voltage detection circuit 63 is connected to the connection point of the diode 34 and the smoothing capacitor 35.

The outputs of these detection circuits 61, 62 and 63 are input to a control circuit 70 (e.g. microcomputer) that executes voltage control, current control and PWM control. Further, a PWM pulse is input from the control circuit 70 to a driving circuit, and the driving circuit 80 is configured to turn the semiconductor switch 33 ON/OFF based on this PWM pulse.

Figure 2:
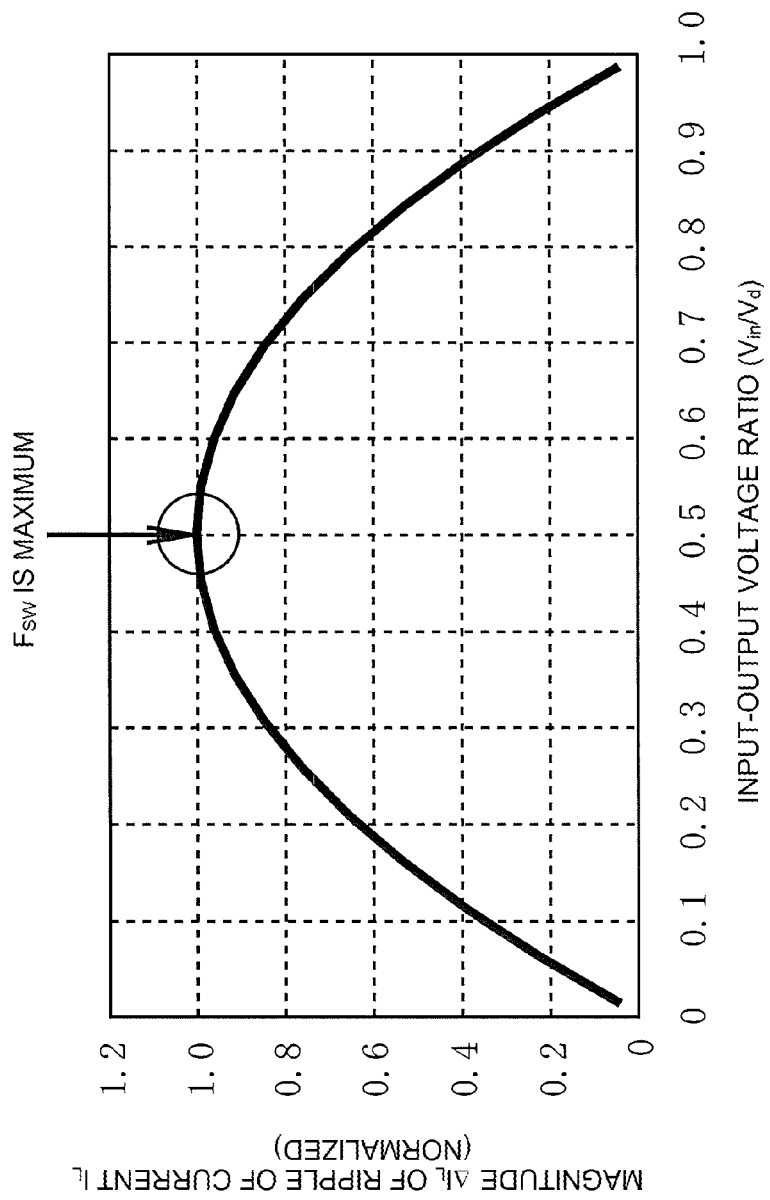
FIG. 2 is a graph depicting the relationship between the input/output voltage ratio and the inductor current ripple in FIG. 1.

In the power factor correction circuit shown in FIG. 1, the normal mode noise is correlated to the magnitude of the ripple included in the current $I_L$ of the inductor 31, and the normal mode noise increases as the ripple of the current $I_L$ increases. Here the (magnitude of) the ripple $\Delta I_L$ of the current $I_L$ is given by Expression 1 shown below, and as shown in FIG. 2, $\Delta I_L$ becomes the maximum with respect to the input/output voltage ratio (AC power supply voltage $V_{in}$/DC output voltage $V_d$) in FIG. 1 when $v_{in}/v_d=0.5$, and becomes smaller as $v_{in}/v_d$ departs from 0.5.

$$\Delta I_L = \frac{v_{in}}{L} \cdot T_{ON} = \frac{v_{in}}{L} \cdot \frac{v_d - v_{in}}{v_d} \cdot T_{SW} \qquad \text{[Expression 1]}$$

$v_{in}$: input voltage instantaneous value $v_d$: output voltage instantaneous value $T_{ON}$: ON period L: inductance of inductor 31

$T_{SW}$: switching cycle

Therefore if the switching frequency $F_{SW}$ is controlled to be the maximum when $v_{in}/v_d=0.5$ where the magnitude of the ripple $\Delta I_L$ becomes the maximum, the change amount of the ripple $\Delta I_L$ per unit time decreases, and the normal mode noise can be effectively reduced.

Figure 3A:
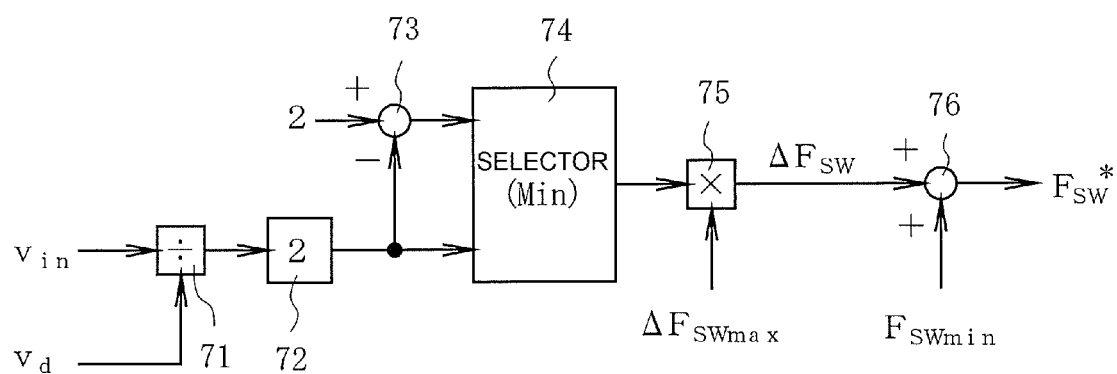
FIGS. 3A and 3B are block diagrams depicting Example 1 of the control circuit in FIG. 1.
Figure 3B:
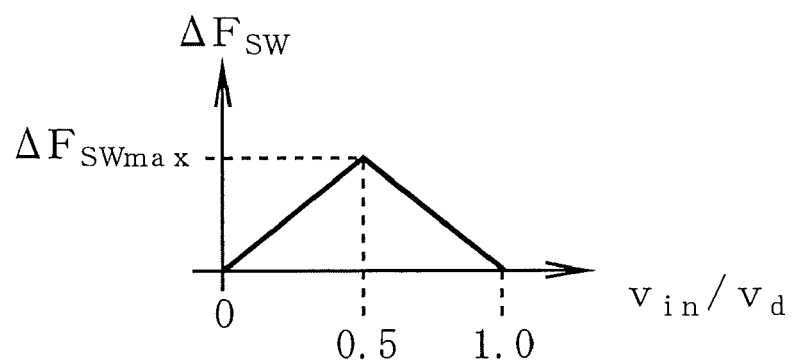

Hence according to Example 1 of the present invention, the switching frequency command value $F_{SW}^*$ is computed in the control circuit 70 in FIG. 1, as depicted in the block diagrams in FIG. 3A and FIG. 3B.

In other words, as shown in the block diagram in FIG. 3A, $v_{in}$ and $v_d$ acquired by the respective detection circuits 61 and 63 in FIG. 1 are input to a division unit 71, and the division result ($v_{in}/v_d$) by the division unit 71 is input to a constant multiplication unit 72, and is multiplied by a constant "2". Then "2×($v_{in}/v_d$)" computed like this and "2−2×($v_{in}/v_d$)" acquired by subtracting the output of the constant multiplication unit 72 from a constant "2" using a subtraction unit 73 are input to a selector 74.

The selector 74 outputs a smaller of the two input values, and a multiplication unit 75 multiplies this output value by a maximum value of the switching frequency change amount "$\Delta F_{SWmax}$", so as to calculate the switching frequency change amount "$\Delta F_{SW}$". Then an addition unit 76 adds the switching frequency change amount "$\Delta F_{SW}$" and the minimum switching frequency "$F_{SWmin}$", whereby the switching frequency command value "$\Delta F_{SW}^*$" is determined.

Based on the switching frequency command value "$\Delta F_{SW}^*$", the frequency of the carrier wave used for the PWM control is changed, whereby the switching frequency $F_{SW}$ of the semiconductor switch 33 in FIG. 1 is changed.

Here as shown in FIG. 3B, the switching frequency change amount "$\Delta F_{SW}$" becomes the maximum value "$\Delta F_{SWmax}$" when $v_{in}/v_d=0.5$, increases linearly from 0 to the maximum value in the range of $0 \leq v_{in}/v_d < 0.5$, and decreases linearly from the maximum value to 0 in the range of $0.5 < v_{in}/v_d \leq 1.0$.

By controlling the switching frequency $F_{SW}$ using the configuration shown in FIG. 3A, the output of the selector 74 always becomes "1" and $\Delta F_{SW}=\Delta F_{SWmax}$ is established when $v_{in}/v_d=0.5$. The switching frequency $F_{SW}$ of the semiconductor switch 33 can be maximized by adding $\Delta F_{SW}$ to the minimum switching frequency "$F_{SWmin}$".

If $v_{in}/v_d \neq 0.5$, the output of the selector 74 always becomes less than "1", hence the switching frequency command value "$F_{SW}^*$" always becomes smaller than the case of $v_{in}/v_d=0.5$.

Needless to say, to determine the switching frequency command value $F_{SW}^*$, the rating of the semiconductor switch 33, the switching loss or the like must be taken into consideration.

Therefore according to Example 1, the switching frequency $F_{SW}$ can be controlled to become the maximum when the ripple $\Delta I_L$ of the current $I_L$, that is the switching frequency $F_{SW}$ when the normal mode noise is the maximum, and the normal mode noise can be effectively reduced by decreasing the change amount of the ripple $\Delta IL$ per unit time.

As a consequence, a compact and small capacity reactor, capacitor or the like can be used even if the filter circuit 15 is disposed as shown in FIG. 1, and the size of the entire apparatus does not become large.

Now Example 2 of the control circuit 70 will be described.

The target frequency for which conduction noise is controlled is 150 [kHz] or more, and if the switching frequency is about 50 [kHz] to 70 [kHz], the frequency to be controlled is three or more times that of the switching frequency. Therefore if a third-order harmonic component with respect to the switching frequency is suppressed, a dramatic noise reduction effect may be demonstrated.

Figure 4:
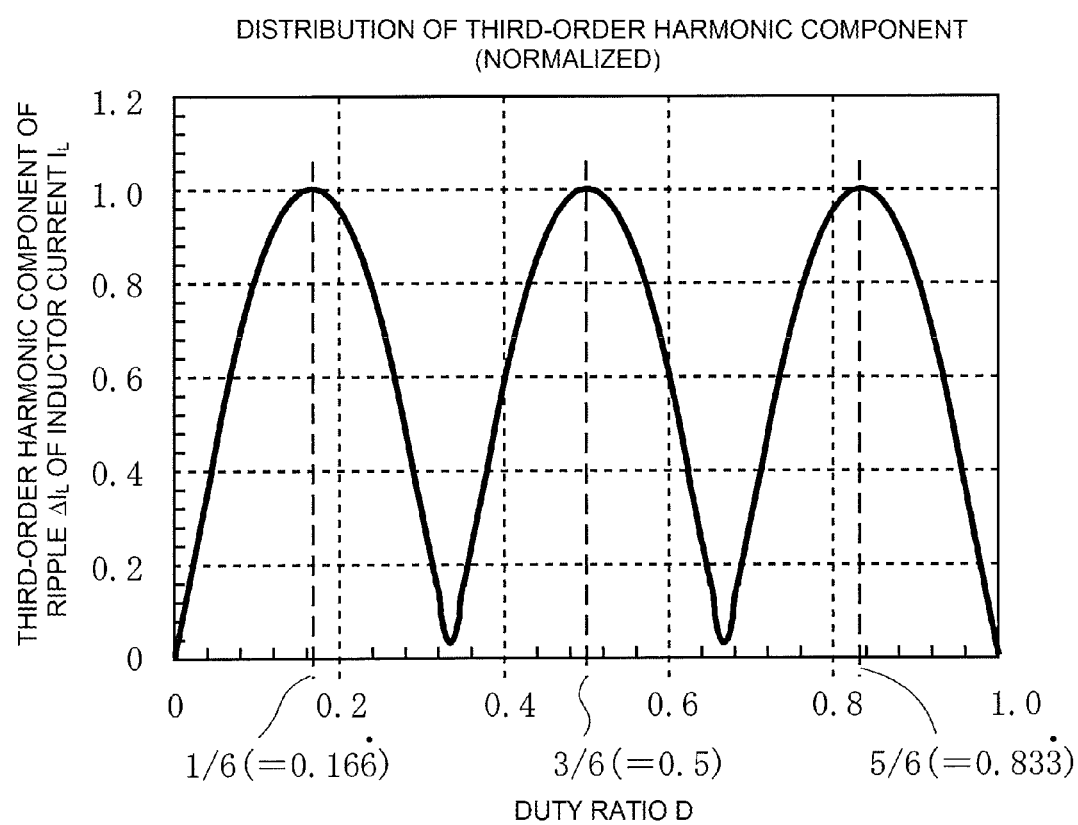
FIG. 4 is a graph depicting the relationship between the duty ratio and the third-order harmonic component of the ripple.

The magnitude of the n-th order harmonic component of the ripple of the current $I_L$ flowing through the inductor 31 is given by Expression 2. According to Expression 2, the third-order harmonic component of the ripple $\Delta I_L$ becomes the maximum when the duty ratio D ($=T_{ON}/T_{SW}$) of the PWM pulse is 1/6, 3/6 or 5/6. FIG. 4 shows the relationship between the duty ratio D and the third-order harmonic component of the ripple $\Delta I_L$.

$$\Delta I_{Ln} = \frac{v_d \cdot T_{SW}}{2L} \cdot \frac{1}{(n\pi)^2} \cdot |\sin(n\pi D)| \qquad \text{[Expression 2]}$$

$\Delta I_{Ln}$: n-th order harmonic component of ripple $\Delta I_L$

D: duty ratio

Therefore if the switching frequency $F_{SW}$ is changed so as to become the maximum when the duty ratio D=1/6, 3/6 or 5/6, noise due to the third-order harmonic component of the ripple $\Delta I_L$ can be effectively reduced.

According to Expression 1 shown above, $T_{ON}/T_{SW}=(v_d-v_{in})/v_d=$duty ratio D, hence "a timing when the duty ratio D=1/6, 3/6 or 5/6" is the same as "a timing when $(v_d-v_{in})/v_d$=1/6, 3/6 or 5/6, in other words a timing when $v_{in}/v_d$=5/6, 3/6 or 1/6".

Figure 5:
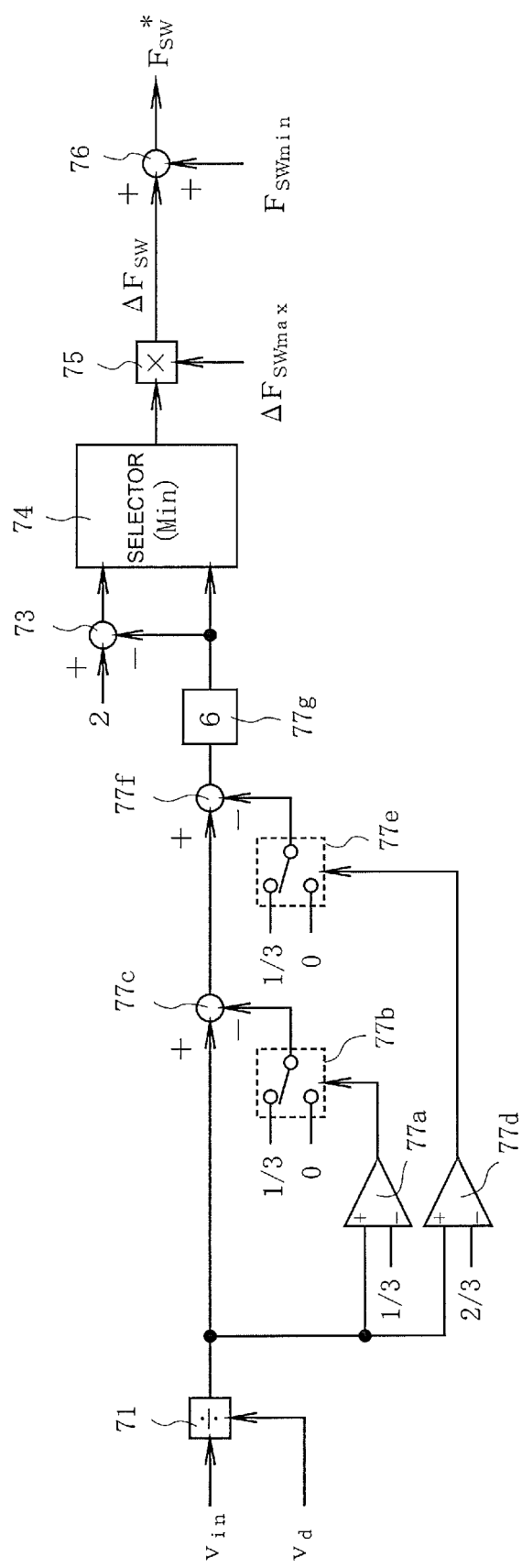
FIG. 5 is a block diagram depicting Example 2 of the control circuit in FIG. 1.

In Example 2 of the present invention, the switching frequency command value $F_{SW}*$ is computed in the control circuit 70 in FIG. 1, as shown in the block diagram in FIG. 5, based on the above mentioned aspect. The difference between FIG. 5 and FIG. 3A and FIG. 3B is the portion from the output side of the division unit 71 to a constant multiplication unit 77g, and the rest of the configuration is the same as FIG. 3A and FIG. 3B.

In other words, as shown in FIG. 5, the division result $(v_{in}/v_d)$ by the division unit 71 is input to the non-inverting input terminals of first and second comparison units 77a and 77d. The first comparison unit 77a outputs a signal at "High" level when $v_{in}/v_d$ is greater than "1/3", and the second comparison unit 77d outputs a signal at "High" level when $v_{in}/v_d$ is greater than "2/3".

The output signal of the first comparison unit 77a is input to a first switching unit 77b, and the first switching unit 77b is switched to the "1/3" side when the output signal of the first comparison unit 77a is at "High" level, and to the "0" side when the output signal is at "Low" level. The output signal of the second comparison unit 77d is input to a second switching unit 77e, and the second switching unit 77e is switched to the "1/3" side when the output signal of the second comparison unit 77d is at "High" level, and to the "0" side when the output signal is at "Low" level.

Two subtraction units 77c and 77f are connected in series, so that the output of the first switching unit 77b is subtracted from the division result $(v_{in}/v_d)$, and the output of the second switching unit 77e is subtracted from this subtraction result. Then a constant multiplication unit 77g multiplies the output of the subtraction unit 77f by "6", and this multiplication result is input to the selector 74, and along with this operation, a value generated by the subtraction unit 73, subtracting the output of the constant multiplication unit 77g from "2", is input to the selector 74. The configuration in stages after the selector 74 is the same as FIG. 3A and FIG. 3B.

By this configuration, the output of the subtraction unit 77f becomes $v_{in}/v_d$ if $v_{in}/v_d$<1/3, becomes $v_{in}/v_d$–1/3 if 1/3<$v_{in}/v_d$<2/3, and becomes $v_{in}/v_d$–2/3 if $v_{in}/v_d$>2/3.

Hence the outputs of the constant multiplication unit 77g become "6×$(v_{in}/v_d)$", "6×$(v_{in}/v_d-1/3)$", and "6×$(v_{in}/v_d-2/3)$" respectively. The outputs of the subtraction unit 73 according to the outputs of the constant multiplication unit 77g become "2−6×$(v_{in}/v_d)$", "2−6×$(v_{in}/v_d-1/3)$", and "2−6×$(v_{in}/v_d-2/3)$" respectively.

The selector 74 compares "6×$(v_{in}/v_d)$" and "2−6×$(v_{in}/v_d)$", and selects the smaller, or compares "6×$(v_{in}/v_d-1/3)$" and "2−6×$(v_{in}/v_d-1/3)$" and selects the smaller, or compares "6×$(v_{in}/v_d-2/3)$" and "2−6×$(v_{in}/v_d-2/3)$" and selects the smaller, and outputs the selected value to the multiplication unit 75.

Therefore in the case of $v_{in}/v_d$=1/6, $v_{in}/v_d$=3/6 or $v_{in}/v_d$=5/6, the output of the selector 74 becomes "1", and just like Example 1, $\Delta F_{SW}=\Delta F_{SWmax}$ is established. This means that the switching frequency $F_{SW}$ of the semiconductor switch 33 can be maximized by adding $\Delta F_{SW}$ to the minimum switching frequency "$F_{SWmin}$".

In other words, the switching frequency $F_{SW}$ can be maximized when the third-order harmonic component of the ripple $\Delta I_L$ of the current $I_L$ is the maximum, hence the normal mode noise can be effectively reduced by decreasing the change amount of the ripple $\Delta I_L$ per unit time.

Figure 6:
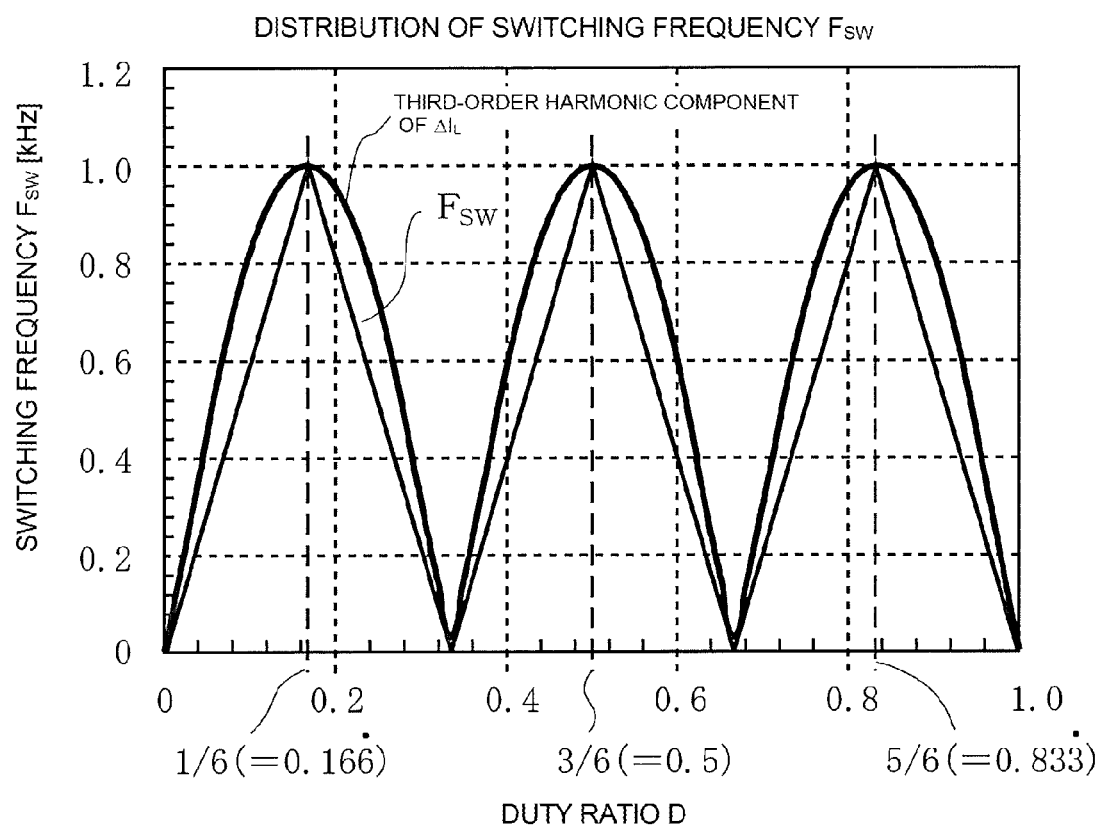
FIG. 6 is a graph depicting the relationship of the duty ratio, the third-order harmonic component of the ripple, and the switching frequency.

FIG. 6 shows the relationship of the duty ratio D, the third-order harmonic component of $\Delta I_L$ and the switching frequency $F_{SW}$ according to Example 2, and as shown in FIG. 6, a desired noise reduction effect can be acquired by changing the switching frequency $F_{SW}$ in the triangular waveform according to the duty ratio D.

Figure 7A:
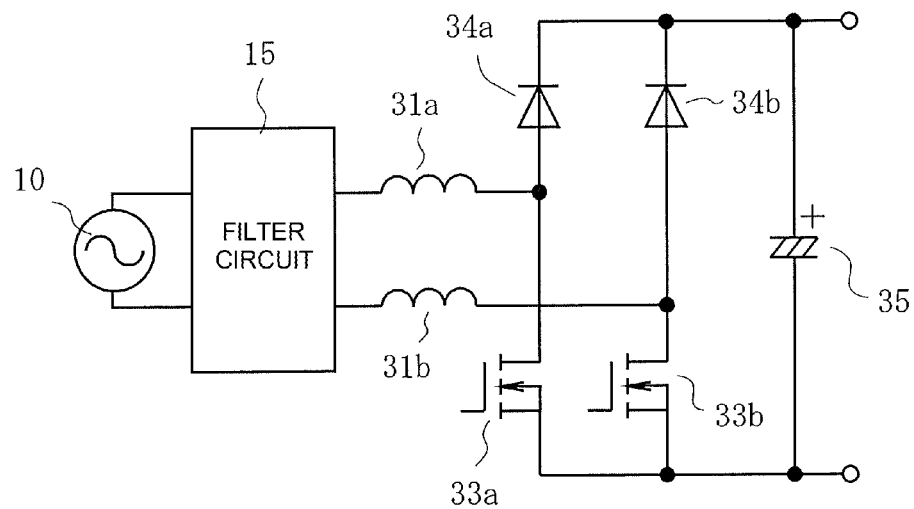
FIGS. 7A and 7B are circuit diagrams depicting key sections of other embodiments of the present invention.
Figure 7B:
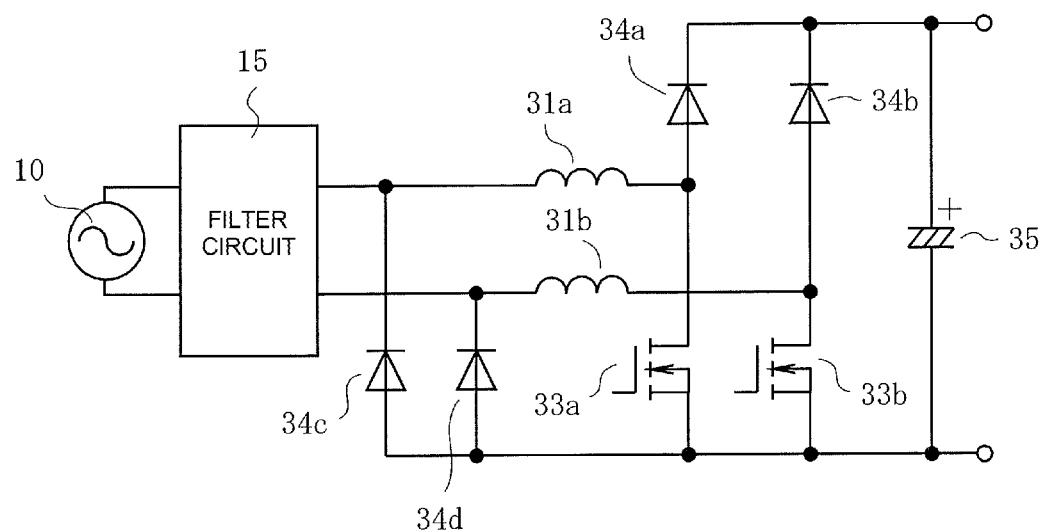

FIG. 7A and FIG. 7B are circuit diagrams depicting key sections of other embodiments of the present invention, where 31a and 31b are inductors, 33a and 33b are semiconductor switches which are alternately turned ON/OFF by a control circuit, and 34a, 34b, 34c and 34d are diodes.

The characteristic of the present invention is that the switching frequency of the semiconductor switch is controlled so that the switching frequency becomes the maximum when the ripple of the current flowing through the inductor, which is connected to the semiconductor switch in series, becomes the maximum, or when the third-order harmonic component of the ripple of the current flowing through this inductor becomes the maximum. Therefore Example 1 (FIG. 3A and FIG. 3B) or Example 2 (FIG. 5) of the control circuit are not limited to the circuit in FIG. 1, but can also be applied to a power factor correction circuit having the configuration shown in FIG. 7A or FIG. 7B, for example.

The present invention can be applied to a boost type AC-DC convertor which rectifies and boosts the AC power supply, particularly to an on-vehicle charger to charge a battery of an electric car or the like using a commercial power supply.

The invention may of course be practiced otherwise than as described without departing from the scope of the invention.

The invention claimed is:

1. A power factor correction circuit, comprising:
   a first series circuit including an inductor and a semiconductor switch for connection between output terminals of an AC power supply,
   a second series circuit of a diode and a smoothing capacitor connected to both ends of the semiconductor switch, both ends of the smoothing capacitor for connection to a load,
   a first voltage detection circuit that detects AC power supply voltage as input voltage; and
   a second voltage detection circuit that detects end-to-end voltage of the smoothing capacitor as output voltage,
   so that a power factor on an input side of the circuit is corrected by a switching operation of the semiconductor switch, the power factor correction circuit further including
   a control circuit that controls a switching frequency of the semiconductor switch, wherein
   the control circuit controls the switching frequency such that the switching frequency becomes a maximum when a ripple of a current flowing through the inductor becomes a maximum, and
   the control circuit controls the switching frequency to the maximum value by detecting a timing when the ripple becomes the maximum based on a ratio of the input voltage to the output voltage.

2. The power factor correction circuit according to claim 1, wherein
   the control circuit detects that the ripple is the maximum when the ratio of the input voltage to the output voltage is 0.5.

3. The power factor correction circuit of claim 1, further comprising a rectifier circuit for connection between the AC power supply and the first series circuit.

4. A power factor correction circuit, comprising:
a first series circuit including an inductor and a semiconductor switch for connection between output terminals of an AC power supply,
a second series circuit of a diode and a smoothing capacitor is connected to both ends of the semiconductor switch, both ends of the smoothing capacitor for connection to a load,
so that a power factor on an input side of the circuit is corrected by a switching operation of the semiconductor switch, the power factor correction circuit comprising
a control circuit that controls a switching frequency of the semiconductor switch variable, wherein
the control circuit controls the switching frequency such that the switching frequency becomes a maximum when a third-order harmonic component of a ripple of a current flowing through the inductor becomes a maximum.

5. A power factor correction circuit comprising:
a first series circuit including an inductor and a semiconductor switch for connection between output terminals of an AC power supply,
a second series circuit of a diode and a smoothing capacitor is connected to both ends of the semiconductor switch, both ends of the smoothing capacitor for connection to a load,
a first voltage detection circuit that detects AC power supply voltage as input voltage; and
a second voltage detection circuit that detects end-to-end voltage of the smoothing capacitor as output voltage,
a control circuit that controls a switching frequency of the semiconductor switch variable, so that a power factor on an input side of the circuit is corrected by a switching operation of the semiconductor switch, wherein
the control circuit controls the switching frequency to a maximum value by detecting a timing when a third-order harmonic component of the ripple becomes a maximum based on a ratio of the input voltage to the output voltage.

6. The power factor correction circuit according to claim 5, wherein
the control circuit detects that the third-order harmonic component of the ripple is the maximum when the ratio of the input voltage to the output voltage is 5/6, 3/6 or 1/6.

7. The power factor correction circuit according to claim 5, wherein
the control circuit detects that the third-order harmonic component of the ripple is the maximum when a duty ratio of a pulse to switch the semiconductor switch is 1/6, 3/6 or 5/6.

8. The power factor correction circuit of claim 4, further comprising a rectifier circuit connected to the first series circuit for connection between the AC power supply and the first series circuit.

9. The power factor correction circuit according to claim 3, further comprising:
a first voltage detection circuit that detects AC power supply voltage as input voltage; and
a second voltage detection circuit that detects end-to-end voltage of the smoothing capacitor as output voltage, wherein
the control circuit controls the switching frequency to a maximum value by detecting a timing when the a third-order harmonic component of the ripple becomes the maximum based on a ratio of the input voltage to the output voltage.

10. The power factor correction circuit according to claim 9, wherein the control circuit detects that the third-order harmonic component of the ripple is the maximum when the ratio of the input voltage to the output voltage is 5/6, 3/6 or 1/6.

11. The power factor correction circuit according to claim 9, wherein the control circuit detects that the third-order harmonic component of the ripple is the maximum when a duty ratio of a pulse to switch the semiconductor switch is 1/6, 3/6 or 5/6.

* * * * *